Nov. 19, 1957  H. P. KEIL  2,813,483
MARGIN CONTROL MECHANISM FOR DUPLICATING MACHINES
Filed Feb. 23, 1954  7 Sheets-Sheet 1

Fig. 1.

INVENTOR.
Henry P. Keil
BY Sreck Wells
Atty.

Nov. 19, 1957

H. P. KEIL 2,813,483

MARGIN CONTROL MECHANISM FOR DUPLICATING MACHINES

Filed Feb. 23, 1954

INVENTOR.
Henry P. Keil
BY
Atty.

Nov. 19, 1957  H. P. KEIL  2,813,483
MARGIN CONTROL MECHANISM FOR DUPLICATING MACHINES
Filed Feb. 23, 1954  7 Sheets-Sheet 6

INVENTOR.
Henry P. Keil
BY GrekWells
Atty.

Nov. 19, 1957　　　　H. P. KEIL　　　　2,813,483
MARGIN CONTROL MECHANISM FOR DUPLICATING MACHINES
Filed Feb. 23, 1954　　　　　　　　　7 Sheets-Sheet 7

Fig. 7

INVENTOR.
Henry P. Keil
BY
Fred Wells
Atty.

United States Patent Office 2,813,483
Patented Nov. 19, 1957

2,813,483

MARGIN CONTROL MECHANISM FOR DUPLICATING MACHINES

Henry P. Keil, Chicago, Ill., assignor to The Fixture Hardware Corporation, Chicago, Ill., a corporation of Illinois Application February 23, 1954, Serial No. 411,981

9 Claims. (Cl. 101—132.5)

My invention relates to a margin control mechanism for duplicating machines. My invention is particularly applicable to liquid process duplicating machines wherein a copy sheet is first moistened with a solvent liquid and is then brought into engagement with a master sheet which has the matter to be duplicated formed thereon in reverse image by an ink deposit which is soluble in the liquid used to moisten the copy sheet. It should be understood, however, that the invention in its broader aspects is not limited to this particular type of duplication. It is applicable in general wherever a blank copy sheet is pressed against a master copy on a rotating drum for the purpose of imprinting the copy sheet from the master.

It is the principal purpose of my invention to provide a novel mechanism whereby the drive rollers which advance the copy sheet to engagement with the master sheet on the drum may be caused to impart their driving motion to the copy sheet earlier or later with respect to the advancing edge of the master sheet inward to vary the spacing of the copied matter on the copy sheet from the leading edge thereof. For some purposes it may be desirable to have the copy begin very close to the leading edge while in other instances a much larger blank margin is desired between the leading edge of the copy sheet and the point where the first line of copy appears on the copy sheet. According to my invention, the mechanism is manually operable at any time during the operation of the duplicating machine to eect a change in the margin between the leading edge of the copy sheet and the first line of the copy thereon.

More particularly it is the purpose of my invention to provide a mechanism for driving the copy sheet feeding and moistening rollers in response to rotation of the platen roller which presses the copy sheet against the master sheet on the drum, together with means shiftable about the drum axis at the will of the operator, for making and breaking the driving connection between the platen roller and the combined feeding and moistening rollers early or later in relation to a particular cycle of rotation of the drum.

The nature and advantages of my invention will appear more fully from the following description and the accompanying drawings wherein a preferred form of the invention is shown. It should be understood, however, that the drawings and description are illustrative only and are not intended to limit the invention except insofar as it is limited by the claims.

In the use of duplicating machines of the character shown herein, certain types of work may require the positioning of the copied matter very close to the leading edge of the copy sheet while other work may require that a substantial margin be left between the leading edge of the copy sheet and the beginning of the copy material. Copying of the same material from a master sheet may be advantageously spaced closer to the leading edge of the copy sheet on some copies and more distant from the leading edge on other copies. There have been many devices provided whereby the margin between the leading edge of the copy sheet and the beginning of the copy material could be changed or adjusted. Such devices, however, have not been completely satisfactory because of inherent difficulties either in the convenience of making the adjustment or in the lack of adequate control to retain the adjustment. According to the present invention, the mechanism by which the copy sheet is advanced to the drum through rotation of the feeding and moistening rollers is controlled in such a manner that simple movement of a control arm exposed through one of the side frames of the machine, changes the timing of the rotation of the feeding and moistening rollers with respect to the rotation of the drum whenever it is desired. The change is made without tightening or loosening any parts and may be made while the drum is rotating or while it is stationary. This control arm permits a wide variation in the spacing of the copy matreial from the leading edge of the copy sheet. It does not in any way interfere with the duplicating operation and has no effect upon the pressure regulating or moistening mechanisms which are so critical in the liquid process duplicating machines.

Figure 1:
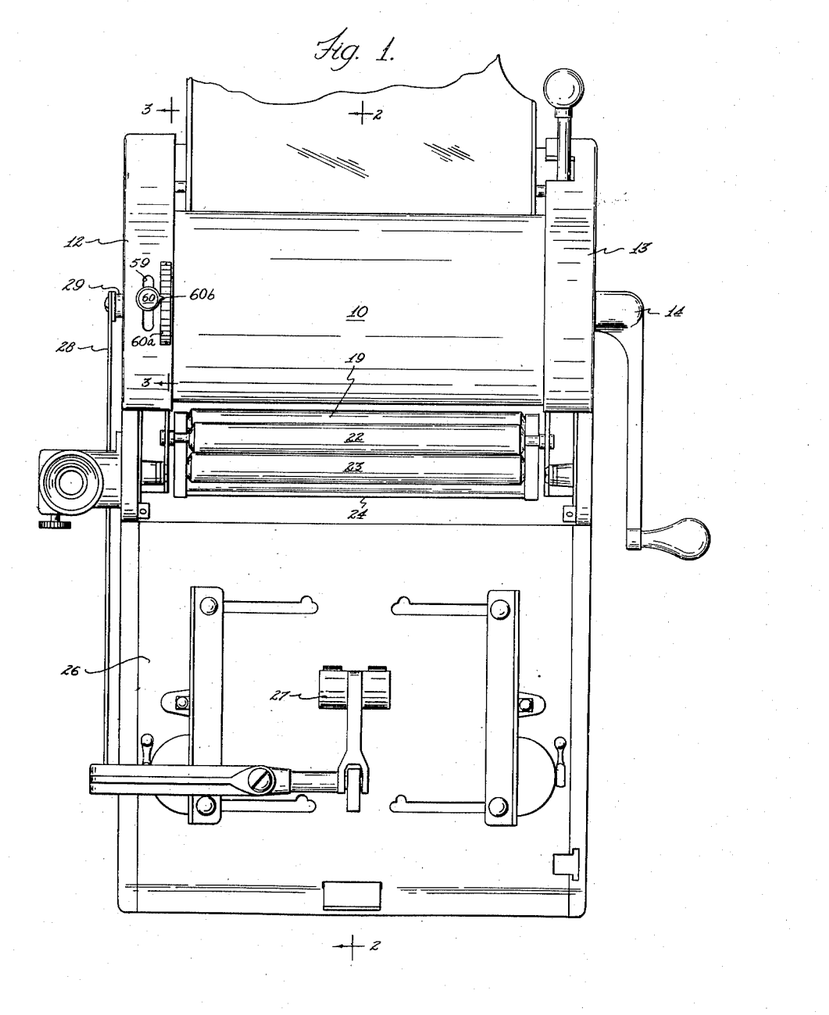
Figure 1 is a plan view of a duplicating machine embodying my invention.
Figure 2:
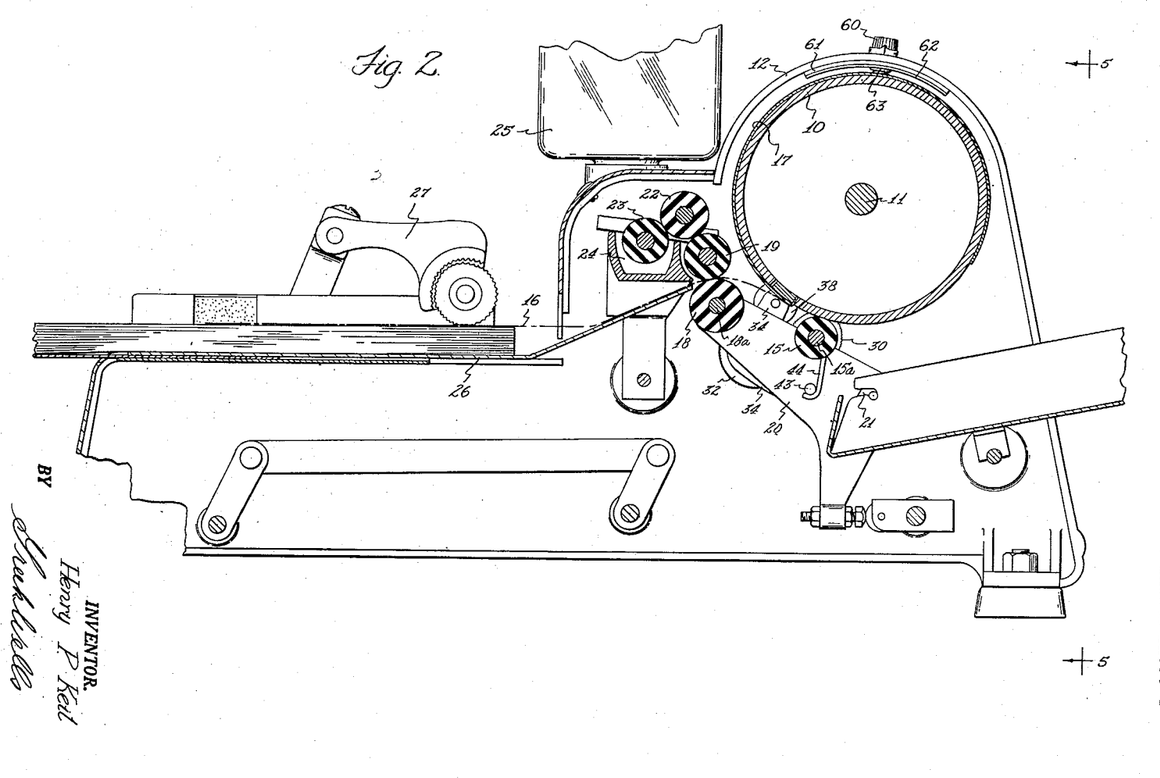
Figure 2 is a somewhat diagrammatic sectional view taken on the line 2—2 of Figure 1.

Referring now to Figures 1 and 2 of the drawings, these figures illustrate somewhat diagrammatically a duplicating machine of the liquid process type to which my invention is applied. In this machine a duplicating drum 10 is mounted by a shaft 11 in two side frames 12 and 13. The drum is rotated by means of a handle 14. The machine has a platen roller 15 which is adapted to press copy sheets 16 against a master sheet 17 which is secured to the drum. The copy sheets, in their advance to the meeting line between the platen roller 15 and the drum 10, are moistened by combined feeding and moistening rollers 18 and 19. The pick up roller 18 of the combined feeding and moistening rollers is carried by lever arms 20 that carry the platen roller 15. These arms 20 are pivoted on pivots 21 to the side frames 12 and 13 and they are movable between an operative position where they hold the platen roller 15 in engagement with the drum and the pick up roller 18 in pressure relation to the moistening roller 19 and an inoperative position where the rollers 15 and 18 are dropped down out of contact with the drum 10 and the moistening roller 19 respectively. The mechanism by which the lever arms 20 are raised and lowered is illustrated in my prior application, Serial No. 279,287. The moistening roller 19 receives its moistening liquid from a transfer roller 22 which is moistened by a fountain roller 23 that runs in a trough 24. The trough 24 is supplied with liquid from a liquid container 25.

Copy sheets are supported in a copy sheet feed tray 26 and are advanced by a copy sheet feeder 27 to the meeting line of the rollers 18 and 19. The drive for the copy sheet feeder 27 is by means of a crank arm 28 that is mounted eccentrically on a collar 29 that is secured to the shaft 11 outside the side frame 12. The details of the mechanism generally described hereinbefore are not important to the present invention so it is believed that the general description will be sufficient to show environment of the present invention.

As illustrated in my prior application, the shafts 15a and 18a of the rollers 15 and 18 project outwardly from the lever arm 20 toward the side frame 12 and have knurled cylinders 30 and 31 fixed thereto. These knurled cylinders are adapted to be drivingly connected by a resilient roller 32 which is pivoted on a shaft 33. The shaft 33 is carried by an auxiliary arm 34 which is mounted on the same pivot 21 as the lever arm 20 but which is spring pressed upwardly in a direction to urge the roller 32 into engagement with the knurled cylinders 30 and 31. A spring 35 is secured under compression between a spring support 36 on the lever arm 20 and a like support 37 on the arm 34. (See Figure 7.) The arm 34 extends upwardly between the side frame 12 and the lever arm 20 and has a cam roller 38 mounted thereon at its upper end.

Figure 4:
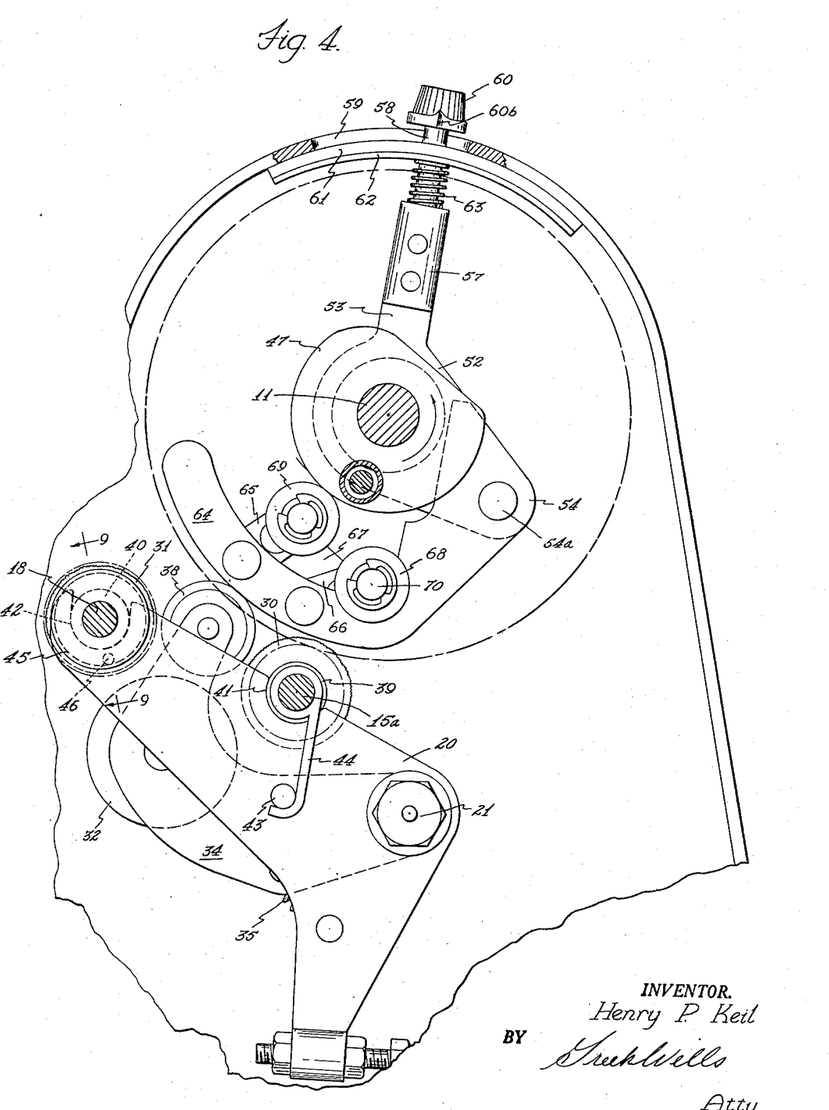
Figure 4 is a sectional view taken substantially on the line 4—4 of Figure 5 with the drum left out.
Figure 5:
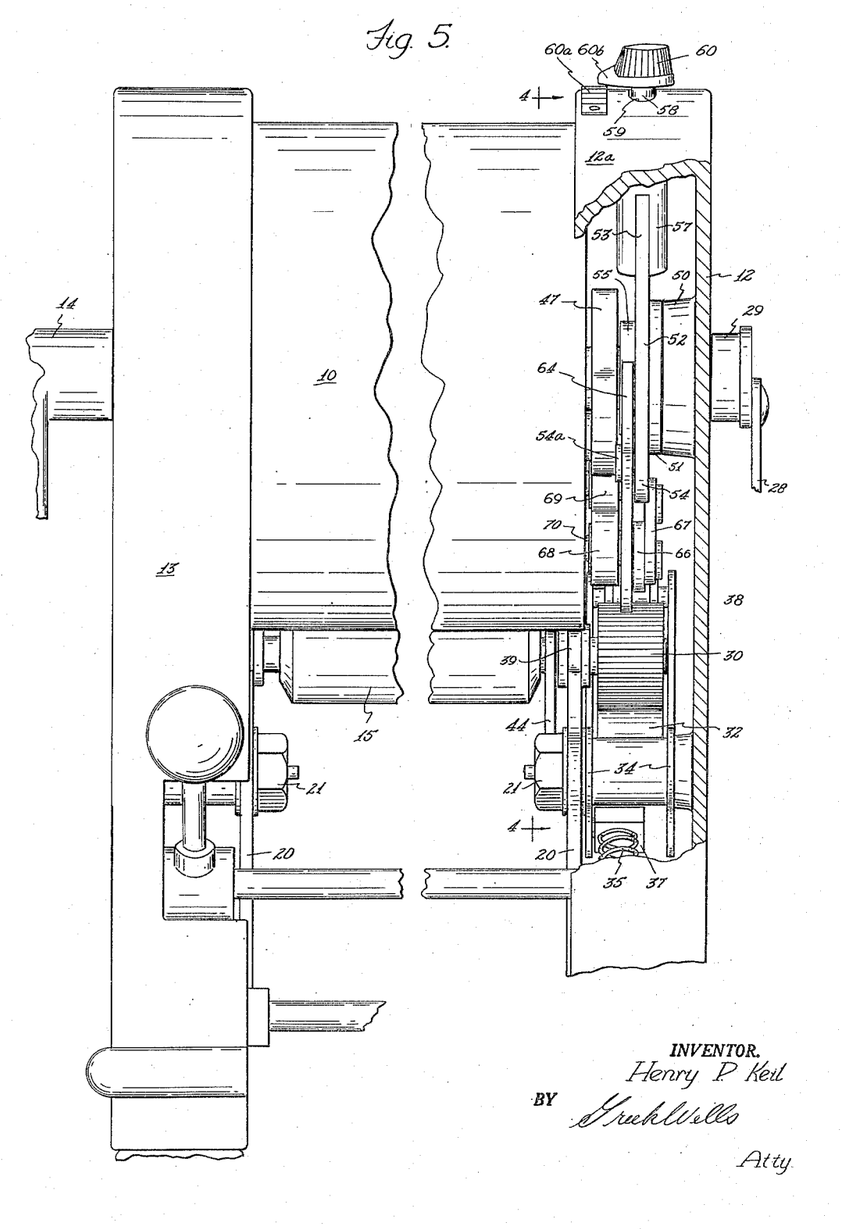
Figure 5 is a view taken on the line 5—5 of Figure 2 with the mid portion of the drum broken away and certain parts of one side frame being broken away to illustrate the driving mechanism.
Figure 9:
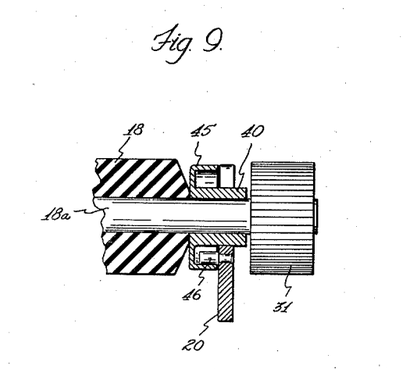
Figure 9 is a fragmentary sectional view taken on the line 9—9 of Figure 4.

It will be appreciated that the spring 35 will tend to cause the roller 32 to lift the shafts 15a and 18a out of their seats in the lever arm 20. These shafts have bearings 39 and 40 respectively thereon for engagement in seats 41 and 42 in the lever arms 20. The bearings, of course, are rotatable on the shafts. In order to hold the shaft 15a down and yet permit its ready release, a pin 43 is provided on the lever arm 20 and a hook 44 is journalled on the shaft 15a. Once the bearing 39 is seated in the seat 41, the hook 44 can be snapped under the pin 43 to keep the shaft 15a in place. The shaft 18a is held in place by a slightly different mechanism which is illustrated in Figures 4 and 9. The bearing 40 has a flange 45 which fits under a pin 46 on the lever 20. The rollers 15 and 18 can be lifted out in the same manner as they are removed in my prior application above referred to.

The mechanism for holding the cam roller 38 down during the major portion of the rotation of the drum 10 and for permiting this roller to rise with the arm 34 for the brief interval necessary in each rotation of the drum to cause the rollers 18 and 19 to advance the copy sheet to the bight of the platen roller and drum will now be described.

Figure 6:
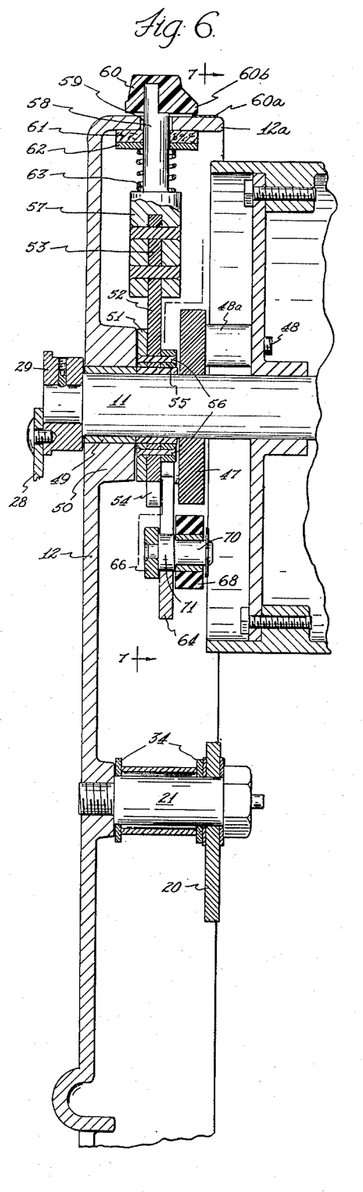
Figure 6 is a sectional view taken substantially on the line 6—6 of Figure 3.
Figure 8:
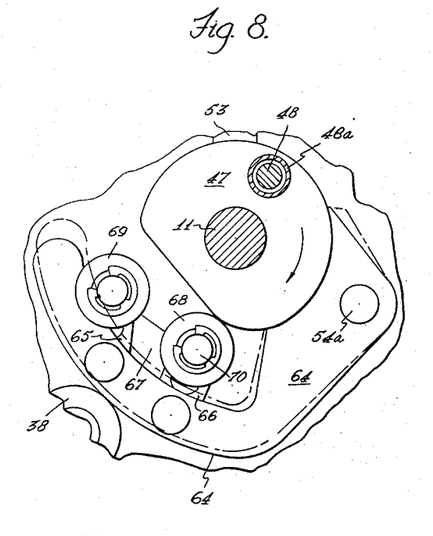
Figure 8 is a fragmentary sectional view taken substantially on the same line as Figures 3 and 4, but showing the relation of certain parts when the duplicating drum is rotated in a reverse direction for the purpose of releasing the master sheet from the drum.

The drum has a small cam 47 fixed thereto. The cam 47 fits over the shaft 11 of the drum and is secured in spaced relation to the drum by a screw bolt 48 and a spacing sleeve 48a. Outwardly of the cam 47, the shaft 11 fits in a bearing sleeve 49 that is seated in a boss 50 in the side frame 12. On the exterior of the bearing sleeve 49 a washer 51 is placed next to the boss 50. Then a lever arm 52, having an upwardly extending portion 53 and a laterally extending portion 54, is mounted. Inwardly of the arm 52 another washer 55 is mounted. The parts 51, 52 and 55 are secured together by pins 56 so that they must rotate as a unit. An extension stem 57 is secured on the portion 53 and has a reduced shaft 58 that extends up through a slot 59 in the top flange 12a of the side frame 12. An indicating and operating handle 60 is secured on the top end of the shaft 58. Beneath the flange 12a I provide a fibrous strip 61 and a curved backing plate 62 which are pressed up against the flange 12a by a spring 63. The parts 61 and 62 are apertured to receive the shaft 58 and serve as a friction grip means adapted to hold the shaft 58 in any selected position along the length of the slot 59. A cam lever 64 is pivoted by a pivot member 54a to the outer end of the portion 54 of the member 52. The lever 64 is positioned to engage the roller 38. The cam lever 64 has two lever arms 65 and 66 pivoted thereon. These lever arms are connected by a link 67 and they carry cam engaging rollers 68 and 69 at their free ends. In the normal operating position when the drum 10 is rotating in the right direction to make copies as indicated by the arrows in Figures 3 and 4, the levers 65 and 66 occupy the positions shown in Figures 3, 4 and 6. The pin 70 that secures the roller 68 to the lever 66 has its enlarged portion 71 resting against the cam lever 64. However, when the drum is rotated in the opposite direction, the levers 65 and 66 are free to move in a counter clockwise from the position shown in Filgure 3 to the position shown in Figure 8.

Referring now in particular to Figures 3, 4, 6 and 7, the operation of my improved margin control mechanism will be explained. As the drum is rotated in the direction indicated by the arrows on Figures 3 and 4, the cam 47 is of course rotated with it. As the leading edge of the master sheet 17 is moved downwardly toward the platen roller 15, the cam 47 has its flat portion 47a approaching the roller 69 on the cam lever 65. While the unflattened portion of the cam 47 is in engagement with the cam roller 69, the cam lever 64 has its curved surface 64a held outwardly against the roller 38 to such an extent that the roller 38 is forced to keep the arm 34 low enough as shown in Figure 4, to hold the roller 32 out of engagement with the knurled cylinders 30 and 31. No motion is transmitted from the platen 15 to the roller 18 so the feeding and moistening rollers 18 and 19 remain stationary. While these rollers 18 and 19 are stationary, the feeding mechanism 27 advances a copy sheet into engagement with them.

Figure 3:
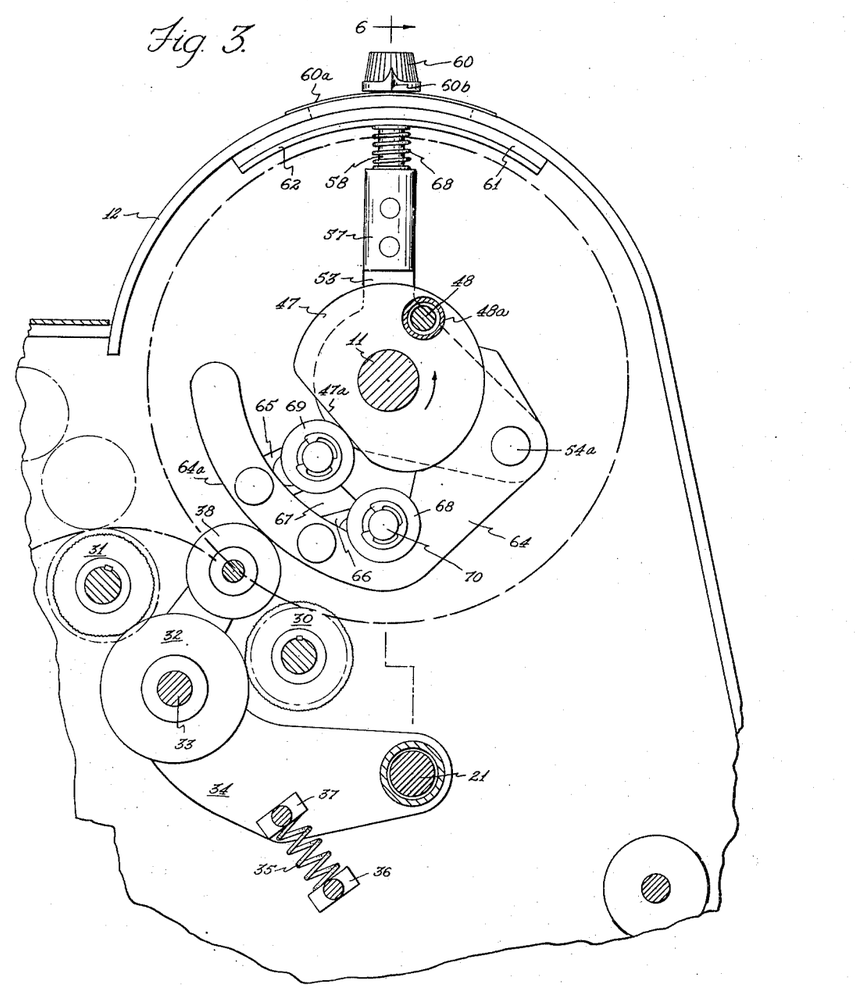
Figure 3 is an enlarged sectional view taken on the line 3—3 of Figure 1, showing the parts in driving position to advance a copy sheet between the moistening and feeding rollers ot the drum, the relative positions of the drum and the rollers being indicated in this figure by broken lines.

As the cam 47 advances to bring its flat surface 47a into engagement with the cam roller 69, the lever 34 is forced by the spring 35 to move the roller 38 upwardly toward the drum shaft 11 and to move the cam lever 64 about its pivot 65 to keep the cam roller 69 in engagement with the surface of the cam 47. The flattened surface 47a is formed so that during about 45 degrees of rotation of the cam 47, the lever 64 and the roller 38 are moved inwardly far enough toward the drum shaft 11 to cause driving engagement between the roller 32 and the knurled cylinders 30 and 31. This transmits the rotating movement of the platen roller 15 to the roller 18 so that rollers 18 and 19 are turned to advance the copy sheet 16 into the bight of the platen roller 15 and the drum 10. Once the copy sheet has started to feed between the platen roller 15 and the drum 10, the driving engagement between the roller 32 and the cylinders 30 and 31 can be broken. The platen roller 15 will continue to pull the copy sheet between the rollers 18 and 19 and the copy sheet itself will cause these rollers to rotate so that the copy sheet will be moistened. The rollers 22 and 23, of course, are driven by engagement of the roller 22 with the roller 19.

The roller 69 can be shifted angularly about the drum shaft 11 by moving the member 52 to right or left from the positions shown in Figures 3 and 4. If the member 52 is turned to the right as shown in Figure 3, this means that the roller 69 will engage the flattened portion 47a of the cam 47 earlier in the cycle of rotation of the drum 10. When this happens the advancement of the copy sheet 16 will be started earlier and the leading edge of the copy sheet will thus reach the bight of the platen roller 15 and the drum 10 more in advance of the arrival of the leading edge of the master sheet 17. In this way a greater margin of clear sheet is left between the leading edge of the copy sheet and the first line of the copy impressed thereon.

To leave a smaller margin of clear sheet at the leading edge of the copy sheet, the member 52 is moved to the left or counter clockwise from the positions shown in Figures 3 and 4. The construction of the parts described hereinbefore is such that the shifting of the member 52 in either direction within the limits provided by the slot 59, can be done at any time during the rotation of the drum 10 or while the drum is at rest. It is thus possible to adjust the margin provided at the head of the copy sheet at any time. The mechanism is simple and cannot be put out of order by lack of skill on the part of the operator. The parts 61, 62 and 63 provide sufficient holding force to prevent movement of the member 52 by the normal operation of the machine. A small indicator plate 60a and a pointer 60b on the handle 60 enables the operator to set the machine for a predetermined margin for the copy sheets.

In the machine shown in my prior application referred to hereinbefore, the master sheet 17 is released by opening the clamp 10a on the drum by reverse rotation of the drum. This has been found to be a satisfactory method of releasing the master sheet for replacement.

The cam roller 68 does not engage the cam 47 during rotation of the drum 10 in the direction indicated in Figures 3 and 4, which is the normal copy making rotation. If the drum 10 is rotated in a reverse direction for any reason, then the cam rollers 68 and 69 are moved by engagement with the cam 47 from the position shown in Figures 3 and 4 to the position shown in Figure 8. In this position the cam roller 68 is the one that engages the cam 47. The pin that carries the roller 69 then engages the cam lever 64.

Engagement of the roller 68 with the cam 47 keeps the cam lever 64 from moving inward toward the drum axis far enough to permit the lever arm 34 to raise the connecting roller 32 into engagement with the knurled cylinders 30 and 31. Reverse rotation of the drum 10 therefore does not drive the feeding and moistening rollers 18 and 19. If the moistening roller were driven in a reverse direction, excessive feeding of liquid over the top of the fountain roller 23 would cause flooding of the moistening roller when normal rotation is resumed. The freedom of the cam rollers 68 and 69 to move from the position shown in Figure 3 to the position shown in Figure 8 upon reverse rotation of the drum, also avoids the tendency of the impact of the cam 47 on the cam rollers to move the margin adjustment out of place.

Figure 7:
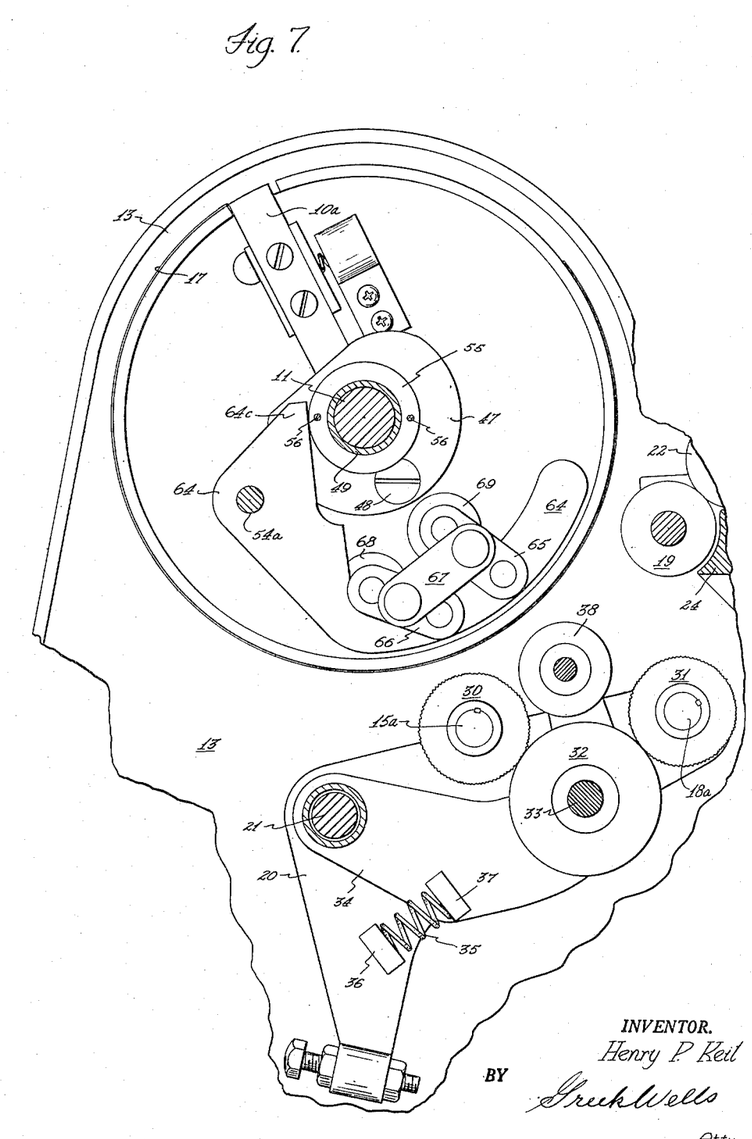
Figure 7 is a sectional view taken on the line 7—7 of Figure 6.

Figure 7 of the drawings shows the position of the parts when the lever arms 20 that carry the platen roller 15 and the pick-up roller 18 are moved to drop these rollers out of contact with the drum 10 and the moistening roller 19. In this position the cam roller 38 on the arm 34 is spaced a substantial distance from the cam lever 64. The cam lever 64 is free to drop far enough about its pivot 54a to space the cam roller 69 from the cam 47 in all positions of the cam 47. A finger 64c on the cam lever 64 engages the spacing washer 55 to limit the drop of the cam lever 64.

The combination of the margin adjusting mechanism with the members 31—38 that effect driving connection between the platen roller 15 and the pick-up roller 18 provides for varying the margin left at the leading end of the copy sheet in a simple, fool proof manner. The only part that rotates with the drum is the cam 47. It is fixed to the drum in one position. All of the margin adjusting parts have very limited movement. The spring 35 furnishes the force to keep the roller 69 in engagement with the cam 47 and to keep the roller 38 in engagement with the cam lever 64.

It is believed that the nature and advantages of my invention will be clear from the foregoing description.

Having described my invention, I claim:

1. In a duplicating machine, a supporting frame, a drum mounted for rotation in the frame and having means thereon to mount a master sheet, a pair of rollers mounted in said frame adjacent to said drum in position, when driven, to feed a copy sheet placed therebetween toward the drum, a platen roller mounted in said frame for pressure engagement with the drum in position to press a copy sheet fed by said pair of rollers against the drum, means to rotate the drum and platen roller, the platen roller and one of said pair of rollers each having a drive wheel at one end thereof, a lever arm mounted by the frame to move toward and away from the drum axis and having means thereon operable by movement of the lever arm toward and away from the drum axis to make and break driving connection between said wheels, a cam rotating with the drum, a member mounted for angular adjustment about the drum axis, and a cam lever pivoted on said member for movement toward and away from the drum axis, said cam lever having means thereon adapted to engage the cam and move the cam lever in response to rotation of the cam to vary the distance of said cam lever from the drum axis, said lever arm having means thereon engaging the cam lever and moving the lever arm with respect to the drum axis in response to movement of the cam lever.

2. In a duplicating machine, a supporting frame, a drum mounted for rotation in the frame, means on the drum to secure a master sheet thereto, a platen roller rotatably mounted in the frame in position to press a copy sheet against the drum, a pair of copy sheet feeding and moistening rollers mounted in the frame in position to advance a copy sheet to the platen roller and drum, drive means for interconnecting one of said pair of rollers and the platen roller including a member movable toward and away from the drum axis to make and break the drive connection, means urging said member toward the drum axis, a cam rotating with the drum, a hand operated lever pivoted on the drum axis for angular adjustment with respect to the drum, a cam lever carried by said hand operated lever and extending between said member and the drum axis, said cam lever having a cam roller thereon riding on said cam operable to shift the cam lever radially with respect to the drum axis in response to rotation of the cam, said cam lever having an elongated convex outer surface engaging said movable member.

3. In a duplicating machine, a supporting frame, a drum mounted for rotation in the frame, means on the drum to secure a master sheet thereto, a platen roller rotatably mounted in the frame in position to press a copy sheet against the drum, a pair of copy sheet feeding and moistening rollers mounted in the frame in position to advance a copy sheet to the platen roller and drum, drive means for interconnecting one of said pair of rollers and the platen roller including a member movable toward and away from the drum axis to make and break the drive connection, a cam rotating with the drum, a hand operated lever pivoted on the drum axis for angular adjustment with respect to the drum, a cam lever carried by said hand operated lever and extending between said member and the drum axis, said cam lever having a cam roller thereon riding on said cam operable to shift the cam lever radially with respect to the drum axis in response to rotation of the cam, said cam lever having an elongated convex outer surface engaging said movable member, said movable member including a roller riding on the cam lever and spring means urging the member toward the cam lever to keep the last named roller in contact with the cam lever.

4. In a duplicating machine, a supporting frame, a drum mounted for rotation in the frame, means on the drum to secure a master sheet thereto, a platen roller rotatably mounted in the frame in position to press a copy sheet against the drum, a pair of copy sheet feeding and moistening rollers mounted in the frame in position to advance a copy sheet to the platen roller and drum, drive means for interconnecting one of said pair of rollers and the platen roller including a member movable toward and away from the drum axis to make and break the drive connection, a cam rotating with the drum, a hand operated lever pivoted on the drum axis for angular adjustment with respect to the drum, a cam lever carried by said hand operated lever and extending between said member and the drum axis, said cam lever having a cam roller thereon riding on said cam operable to shift the cam lever radially with respect to the drum axis in response to rotation of the cam, said cam lever having an elongated convex outer surface engaging said movable member, and a spring connected to said movable member urging it toward the cam lever and urging the roller on the cam lever into engagement with the cam.

5. In a duplicating machine having a rotatable master sheet carrying drum, a platen roller pressing against said drum to press copy sheets against a master sheet on the drum and a pair of copy sheet feeding and moistening rollers adjacent to the drum for moistening and advancing copy sheets to the drum and platen roller, drive means providing a driving connection between the feeding and moistening rollers and the drum intermittently to drive said rollers in timed relation to the rotation of said drum including a cam fixed to the drum, a member movable toward and away from the drum axis under control of said cam to make and break the roller driving connection, a cam lever interposed between the cam and the member said cam lever having a cam follower riding on the cam and an elongated outer surface engaging the member, and a manually operable means mounting the cam lever for movement circumferentially about the drum axis with respect to the cam to advance and retard the making and breaking of said connection with respect to the rotation of the drum.

6. In a duplicating machine having a rotatable master sheet carrying drum, a platen roller pressing against said drum to press copy sheets against a master sheet on the drum and a pair of copy sheet feeding and moistening rollers adjacent to the drum for moistening and advancing copy sheets to the drum and platen roller, drive means providing a driving connection between the feeding and moistening rollers and the drum intermittently to drive said rollers in timed relation to the rotation of said drum including a cam fixed to the drum, a member movable toward and away from the drum axis under control of said cam to make and break the roller driving connection, a cam lever interposed between the cam and the member, a roller carried by said cam lever and engaging the cam to control the movement of the cam lever and said member, and a manually operable means mounting the cam lever for movement circumferentially about the drum axis with respect to the cam to advance and retard the making and breaking of said connection with respect to the rotation of the drum.

7. In a duplicating machine having a rotatable master sheet carrying drum, a platen roller pressing against said drum to press copy sheets against a master sheet on the drum and a pair of copy sheet feeding and moistening rollers adjacent to the drum for moistening and advancing copy sheets to the drum and platen roller, drive means providing a driving connection between the feeding and moistening rollers and the drum intermittently to drive said rollers in timed relation to the rotation of said drum including a cam fixed to the drum, a member movable toward and away from the drum axis under control of said cam to make and break the roller driving connection, a cam lever interposed between the cam and the member and having an elongated outer curved surface engaging the member, spring means urging said member and said cam lever toward the drum axis, and a manually operable means mounting the cam lever for movement circumferentially about the drum axis with respect to the cam to advance and retard the making and breaking of said connection with respect to the rotation of the drum.

8. In a duplicating machine having a rotatable master sheet carrying drum, a platen roller pressing against said drum to press copy sheets against a master sheet on the drum and a pair of copy sheet feeding and moistening rollers adjacent to the drum for moistening and advancing copy sheets to the drum and platen roller, drive means providing a driving connection between the feeding and moistening rollers and the drum intermittently to drive said rollers in timed relation to the rotation of said drum including a cam fixed to the drum, a member movable toward and away from the drum axis under control of said cam to make and break the roller driving connection, a cam lever interposed between the cam and the member and having an elongated outer curved surface engaging the member, two spaced arms pivoted on the cam lever and extending toward the cam, a link connecting said arms, cam rollers carried by said arms, one cam roller being positioned to engage the cam to make said driving connection intermittently upon rotation of the drum in a direction to advance copy sheets fed from the feeding and moistening rollers between the drum and platen roller, the other cam roller being positioned to engage the cam and prevent the making of said driving connection upon rotation of the drum in the opposite direction, and a manually operable means mounting the cam lever for movement circumferentially about the drum axis with respect to the cam to advance and retard the making and breaking of said connection with respect to the rotation of the drum.

9. In a duplicating machine having a rotatable master sheet carrying drum, a platen roller pressing against said drum to press copy sheets against a master sheet on the drum and a pair of copy sheet feeding and moistening rollers adjacent to the drum for moistening and advancing copy sheets to the drum and platen roller, drive means providing a driving connection between the feeding and moistening rollers and the drum intermittently to drive said roller in timed relation to the rotation of said drum including a cam fixed to the drum, a member movable toward and away from the drum axis under control of said cam to make and break the roller driving connection, a cam lever interposed between the cam and the member and having an outer elongated curved surface engaging the member, said cam lever having a roller riding on the cam operable to move the cam lever radially with respect to the drum as the cam rotates, said cam lever being adjustable circumferentially about the drum axis.

References Cited in the file of this patent
UNITED STATES PATENTS

| | | |
|---|---|---|
| 2,622,518 | Peterson et al. | Dec. 23, 1952 |
| 2,643,607 | Levin | June 30, 1953 |